(12) United States Patent
Pringiers

(10) Patent No.: US 8,297,718 B2
(45) Date of Patent: Oct. 30, 2012

(54) RUBBER CRAWLER, METHOD FOR MAKING RUBBER CRAWLER, LUG FOR RUBBER CRAWLER AND VEHICLE PROVIDED WITH RUBBER CRAWLER

(75) Inventor: Koenraad Pringiers, Colombo (LK)

(73) Assignee: Artic Investments S.A., Luxembourg (LU)

( * ) Notice: Subject to any disclaimer, the term of this patent is extended or adjusted under 35 U.S.C. 154(b) by 0 days.

(21) Appl. No.: 13/360,074

(22) Filed: Jan. 27, 2012

(65) Prior Publication Data

US 2012/0139334 A1 Jun. 7, 2012

Related U.S. Application Data

(63) Continuation of application No. 12/735,695, filed as application No. PCT/EP2009/052372 on Feb. 27, 2009.

(30) Foreign Application Priority Data

Feb. 27, 2008 (EP) ..................................... 08152031

(51) Int. Cl.
*B62D 55/088* (2006.01)
*B62D 55/24* (2006.01)
(52) U.S. Cl. .......................... 305/112; 305/114; 305/165
(58) Field of Classification Search .................. 305/100, 305/111, 112, 114, 157, 160, 165, 166, 185
See application file for complete search history.

(56) References Cited

U.S. PATENT DOCUMENTS

| | | | | |
|---|---|---|---|---|
| 2,592,541 | A | * | 4/1952 | Curtis ............................ 305/112 |
| 3,857,617 | A | * | 12/1974 | Grawley ........................ 305/180 |
| 4,469,379 | A | | 9/1984 | Kotyuk |
| 4,481,993 | A | * | 11/1984 | Ohnishi .................... 152/209.12 |
| 5,632,537 | A | * | 5/1997 | Yoshimura et al. ........... 305/173 |
| 6,296,328 | B1 | * | 10/2001 | Wilkinson ..................... 305/158 |
| 6,352,320 | B1 | * | 3/2002 | Bonko et al. .................. 305/178 |
| D455,444 | S | | 4/2002 | Tsuru |
| 6,474,756 | B2 | * | 11/2002 | Hori et al. ...................... 305/178 |
| 7,258,405 | B2 | * | 8/2007 | Pringiers ....................... 305/193 |
| 7,637,296 | B2 | * | 12/2009 | Bonko et al. ............... 152/209.8 |
| 2006/0238027 | A1 | | 10/2006 | Dandurand |

* cited by examiner

*Primary Examiner* — Kip T Kotter
(74) *Attorney, Agent, or Firm* — Jacobson Holman PLLC

(57) ABSTRACT

A rubber crawler for a tracked vehicle involves an endless rubber belt body for revolving around first and second members that are spaced from each other, which belt body has an outer peripheral face including a plurality of lugs that protrude outwardly from the belt body, each of which lugs has a ground-contacting surface and a sidewall extending outwardly from the belt body to the ground-contacting surface, the sidewall having a groove extending transversely to the length direction of the belt body, and each of which lugs is at least partially made of material that is deformable, at the groove of the sidewall, when the belt body bends to facilitate removal of soil from the groove.

30 Claims, 11 Drawing Sheets

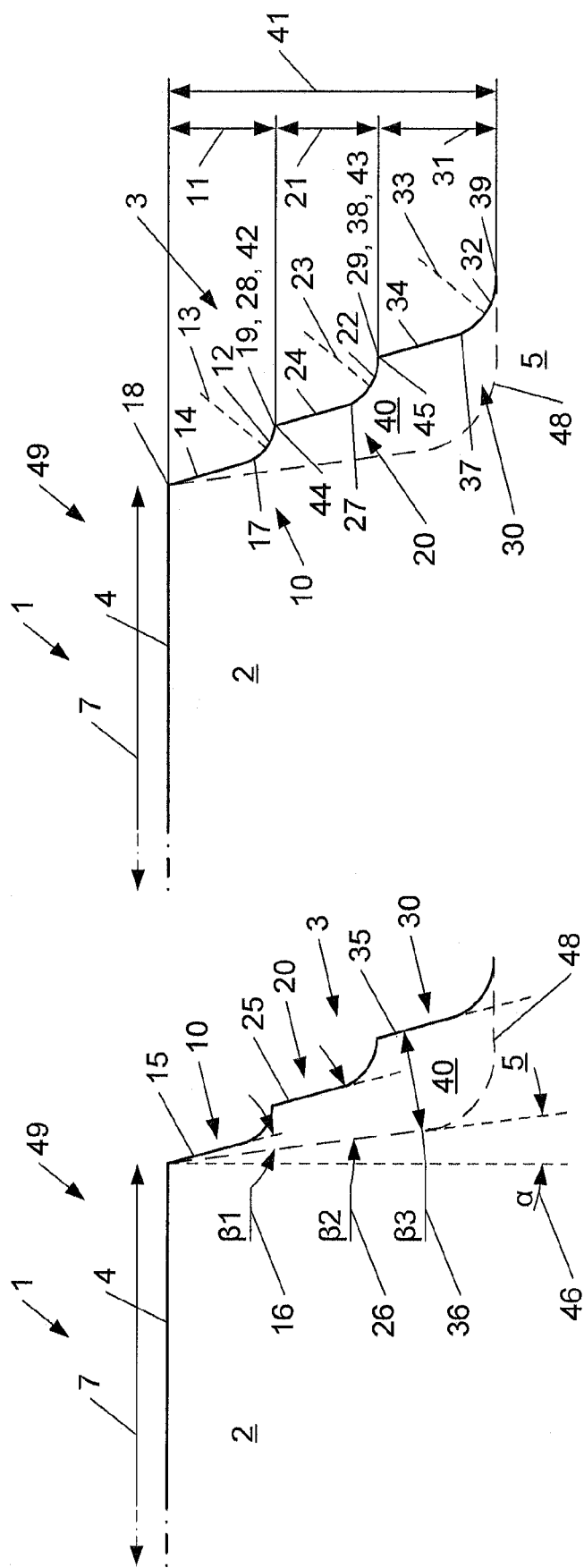

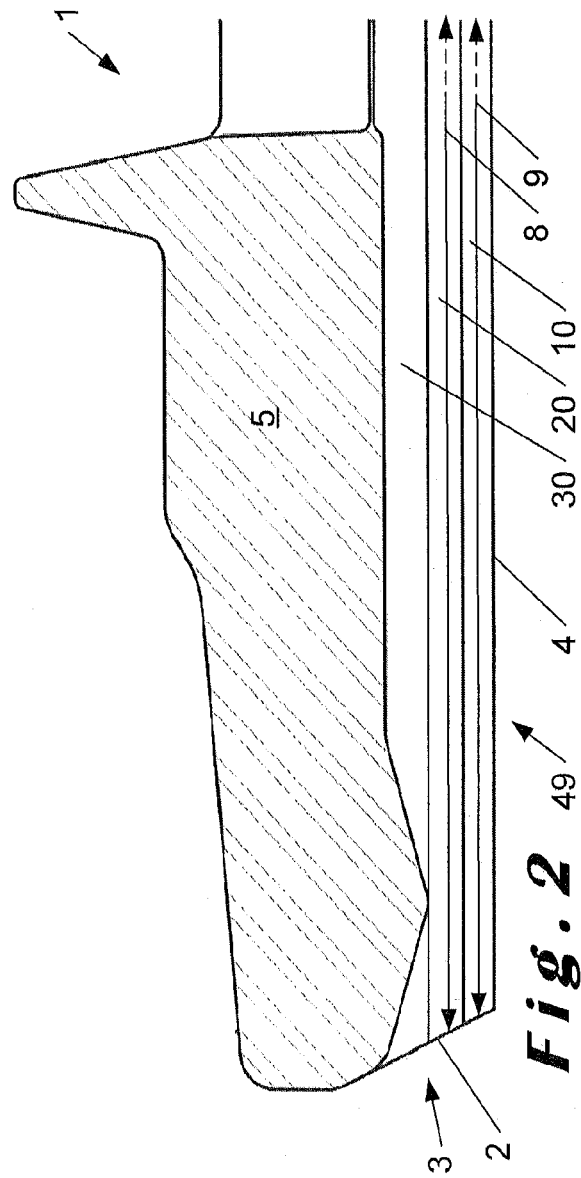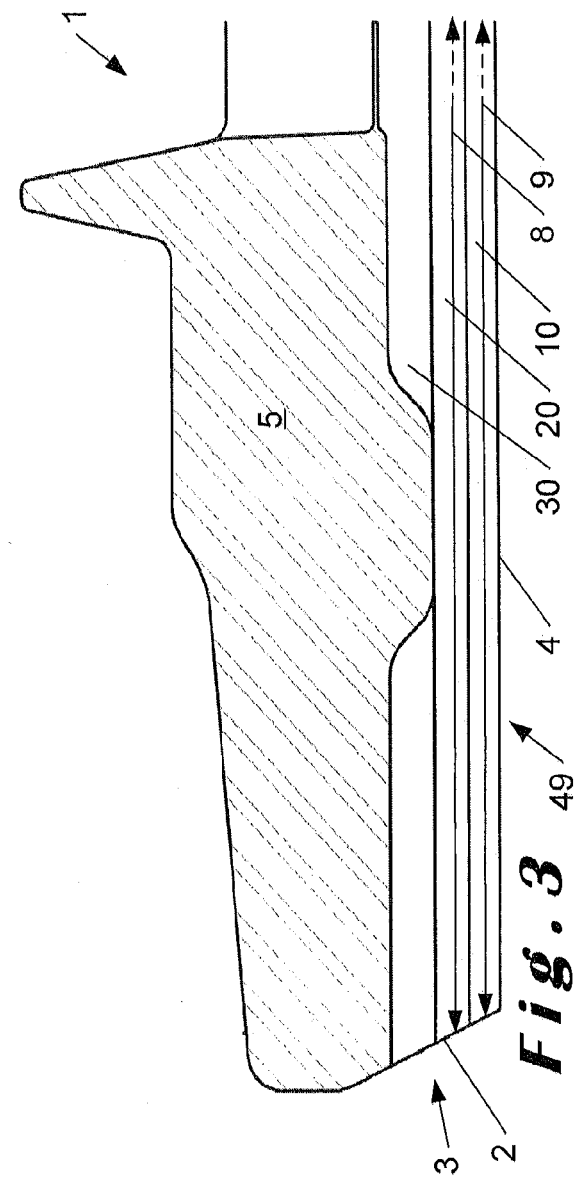

RUBBER CRAWLER, METHOD FOR MAKING RUBBER CRAWLER, LUG FOR RUBBER CRAWLER AND VEHICLE PROVIDED WITH RUBBER CRAWLER

This is a continuation of Ser. No. 12/735,695, filed Feb. 22, 2011 which is a 371 of PCT/EP09/052372, filed Feb. 27, 2009, and published in English, which claims priority from European Patent Application No. 08152031.4 filed on Feb. 27, 2008, the disclosures of which are incorporated by reference herein.

The present invention relates to a rubber crawler for a tracked vehicle according to the preamble of the first claim.

The present invention also relates to a method for making such a rubber crawler, a lug for such a rubber crawler and a vehicle provided with such a rubber crawler.

Rubber crawlers for tracked vehicles are already well known to the person skilled in the art. Such a rubber crawler comprises an endless rubber belt body which is provided with a lug pattern at its outer peripheral face to provide the rubber crawler with certain traction properties, for example to be able to use the rubber crawler on grounds which are generally difficult to cross such as for example loose sand or mud. The lug pattern is formed by a plurality of lugs comprising a tread surface for creating a running surface and an upright sidewall extending from the tread surface towards the rubber belt body. An example of such a rubber crawler provided with such a lug pattern is shown in USD455444. It is well known to mount such a rubber crawler around two wheels, in general sprocket wheels, for supporting and driving the vehicle.

When analysing the problem with existing devices, traction deteriorates upon use when used in particular circumstances. The inventor has found that traction loss occurs when the space between the lugs is filled with soil material, and that the soil material generally stays behind in the space between the lugs. For example, when using the rubber crawler in muddy conditions, the mud fills up the spaces between the lugs and the mud generally remains there. Without wanting to be bound by any theory, it is believed that this is caused by the levelling of the running surface of the rubber crawler due to the filling of the spaces between the lugs, which reduces grip.

There is thus a need for a rubber crawler with improved traction properties.

Being faced with the above described problem, the inventor realised that the traction properties of the rubber crawler can be improved if the soil material filling up the spaces between the lugs is regularly removed from the spaces between the lugs while driving the rubber crawler.

Accordingly it is an object of the present invention to provide a rubber crawler in which material filling up the spaces between the lugs is regularly removed while driving the rubber crawler.

This is achieved according to the present invention by providing a rubber crawler showing the technical features of the characterising part of the first claim.

Thereto, the upright sidewall comprises at least one groove which extends along at least part of the upright sidewall along a second direction which transverses the length direction of the rubber belt body and in that the lug is at least partly made of a material which is deformable at the position of the groove when subjected to the bending to facilitate removal of soil material contained in the groove.

The inventor has found that the regular removal of soil material between the lugs can be achieved by providing such a groove.

Without wanting to be bound by any theory, it is believed that during revolution of the rubber crawler around the first and the second member, such as for example sprocket wheels, the rubber crawler is subject to bending and that therefore the lugs of the rubber crawler are also subjected to bending, causing deformation of the lugs. The inventor has found that when the lug is subjected to the bending and comprises a groove with the technical features of the characterising part of the first claim, the deformability of the material at the position of the groove causes the shape of the cross-section of the groove to change. It is believed that when the belt moves towards and along the members, the bending of the lug at the location of the groove causes that the height of the groove increases while the depth of the groove decreases, the bending of the lug at the location of the groove in other words causes that the groove is stretched open in height direction of the groove causing the bottom of the groove to rise towards the tread surface. This deformation of the material at the position of the groove causes that soil material filling up the spaces between the lugs is pushed out of the grooves by the rising bottom of the groove, as a result of which the soil material filling up the spaces between the lugs of the rubber crawler is removed from the spaces between the lugs, thereby substantially improving the traction properties of the rubber crawler.

Since the removal of the soil material filling op the spaces between the lugs is caused by the bending of the lugs caused by the revolution of the rubber crawler around the members, the removal of soil material is powered by the driving of the vehicle, i.e. during use of the vehicle. The rubber crawler in other words has self-cleaning properties.

A preferred embodiment of the present invention is characterised in that the groove has a cross-section which widens from the interior of the lug towards the exterior of the lug.

The inventor has found that such a cross-section of the groove allows an improved removal of soil material from the groove. It is believed that when a groove having such a cross-section is subjected to bending, the widened shape of the cross-section allows for an improved rising of the bottom of the groove towards the tread surface which permits an improved removal of soil material from the groove and thus in an improved removal of soil material from the spaces between the lugs.

Another preferred embodiment of the present invention is characterised in that the upright sidewall of the lug faces the first member when moving from the first member to the second member in a revolving movement.

By revolving around the first and second member, the rubber crawler defines a driving direction for the tracked vehicle. The inventor has found that when the upright sidewall facing the first member when moving from the first member to the second member is provided with the groove, the removal of soil material from the spaces between the lugs is improved. Without wanting to be bound to any theory, it is believed that this is caused by the position of the groove with respect to the driving direction.

Further preferred embodiments are disclosed in the dependent claims.

The present invention also relates to a method for producing a rubber crawler as described above, the rubber crawler comprising an endless rubber belt body which is provided to revolve around a first and second member which are spaced from each other, being subject to bending when revolving around the members and being provided at its outer peripheral face with a plurality of lugs which protrude from the belt body, at least one lug comprising a tread surface and at least one upright sidewall extending from the tread surface to the rubber belt body along a first direction which transverses the length direction of the rubber belt body, the tread surface of subsequent lugs being provided to create a running surface for the crawler.

The method according to the invention is characterised in that at least one groove is formed the upright sidewall of the lug in material so that the groove extends along a second direction onto the upright sidewall, the second direction transversing the length direction of the rubber belt body, the material deforming the groove when subjected to the bending to facilitate removal of soil material contained in the groove.

Preferred embodiments are disclosed in the dependent claims.

The present invention also relates to a lug provided with a groove for a rubber crawler according to the invention.

The present invention further relates to a vehicle with a rubber crawler according to the invention.

Other details and advantages of the rubber crawler according to the invention will become apparent from the enclosed figures and description of preferred embodiments of the invention.

BRIEF DESCRIPTION OF THE DRAWINGS

FIGS. 1a and 1b show a detail of a cross-section along a length direction of a rubber crawler according to the invention.

FIG. 2 shows a detail of a cross-section along a width direction of a rubber crawler according to the invention.

FIG. 3 shows a detail of a different cross-section along a width direction of a rubber crawler according to the invention.

Figure 4:
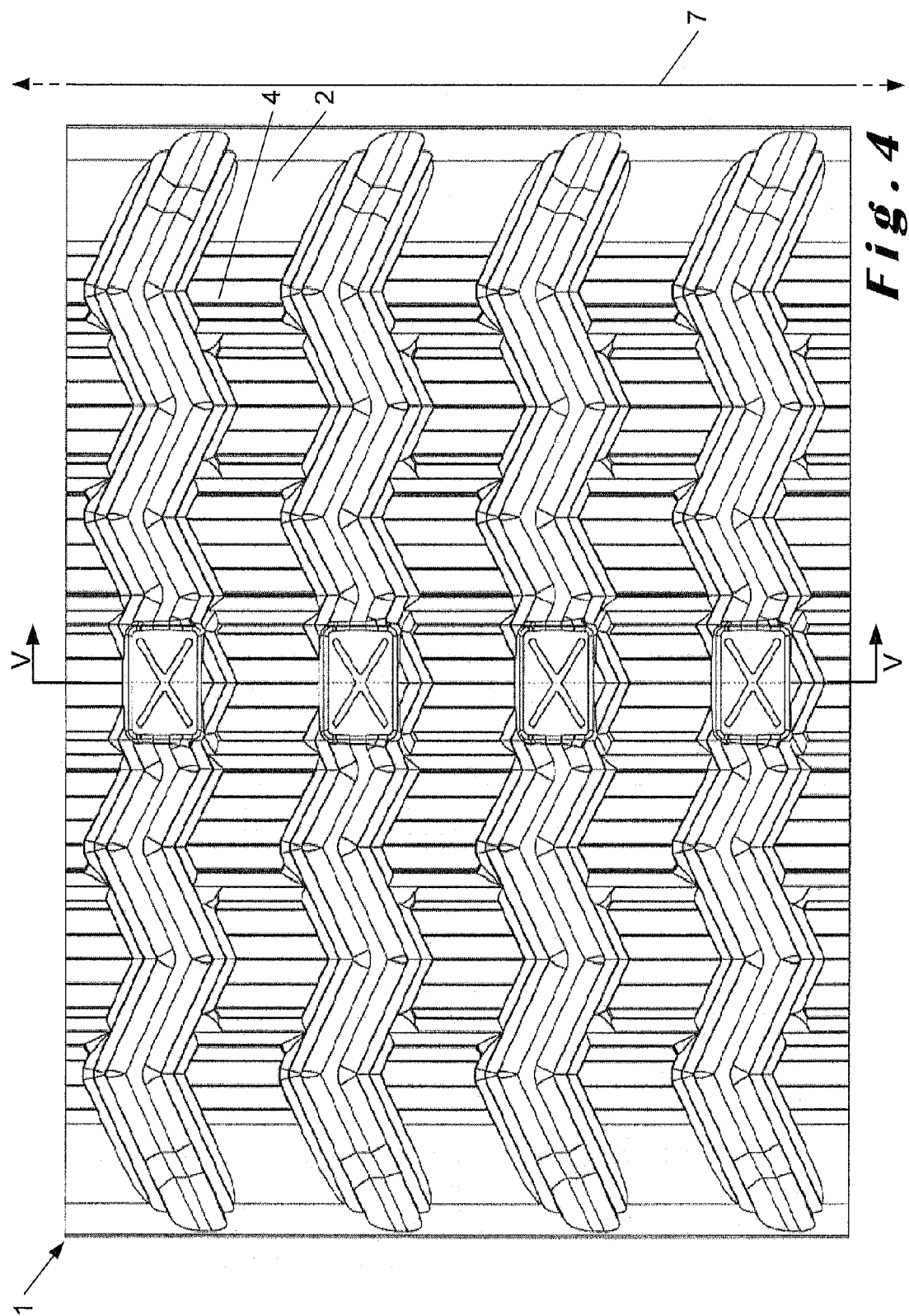
FIG. 4 shows a top view of a rubber crawler according to the invention.

The current invention relates to a rubber crawler 1 for a tracked vehicle. When mounted to the tracked vehicle, the rubber crawler 1 is provided to revolve around a first and a second member of the tracked vehicle, the first member being spaced from the second member. The rubber crawler 1 comprises a rubber belt body 5 which is provided to revolve around the first and the second member of the tracked vehicle. Although the vehicle and the first and the second member are not shown, the use of the first and the second member for driving the rubber crawler 1 mounted to the vehicle is well-known to a person skilled in the art.

The rubber crawler 1 preferably is adapted to the conditions of use in which the rubber crawler 1 is used. With conditions of use is for example meant the soil onto which the rubber crawler 1 will be used, the characteristics of the soil onto which the rubber crawler 1 is used such as for example hard, soft, abrasive, etc., the condition of the soil such as for example wet, dry, coherent, etc., the frequency of use, the velocity with which the rubber crawler 1 is used, the vehicle supported by the rubber crawler 1, etc. The rubber crawler 1 can be adapted to the conditions of use by for example adapting the choice for the material(s) of the different parts of the rubber crawler 1, the dimensions and shape of the different parts of the rubber crawler 1, the dimension and shape of the rubber crawler 1, etc. Specific embodiments and examples of the rubber crawler 1 and its parts are for example given below.

The rubber crawler 1 has a length direction 7 and a width direction. The rubber crawler 1 is provided to revolve around the two members in length direction 7 of the rubber crawler 1 and the width direction is substantially perpendicular to the length direction 7.

The rubber belt body 5 comprises a plurality of lugs 2 at its peripheral face 49 which protrude from the rubber belt body 5. The peripheral face 49 of the rubber crawler 1 is the face on the side of the rubber crawler 1 opposite the side facing the first and second member. While in use, the peripheral face 49 at least partly contacts the ground.

Figure 9:
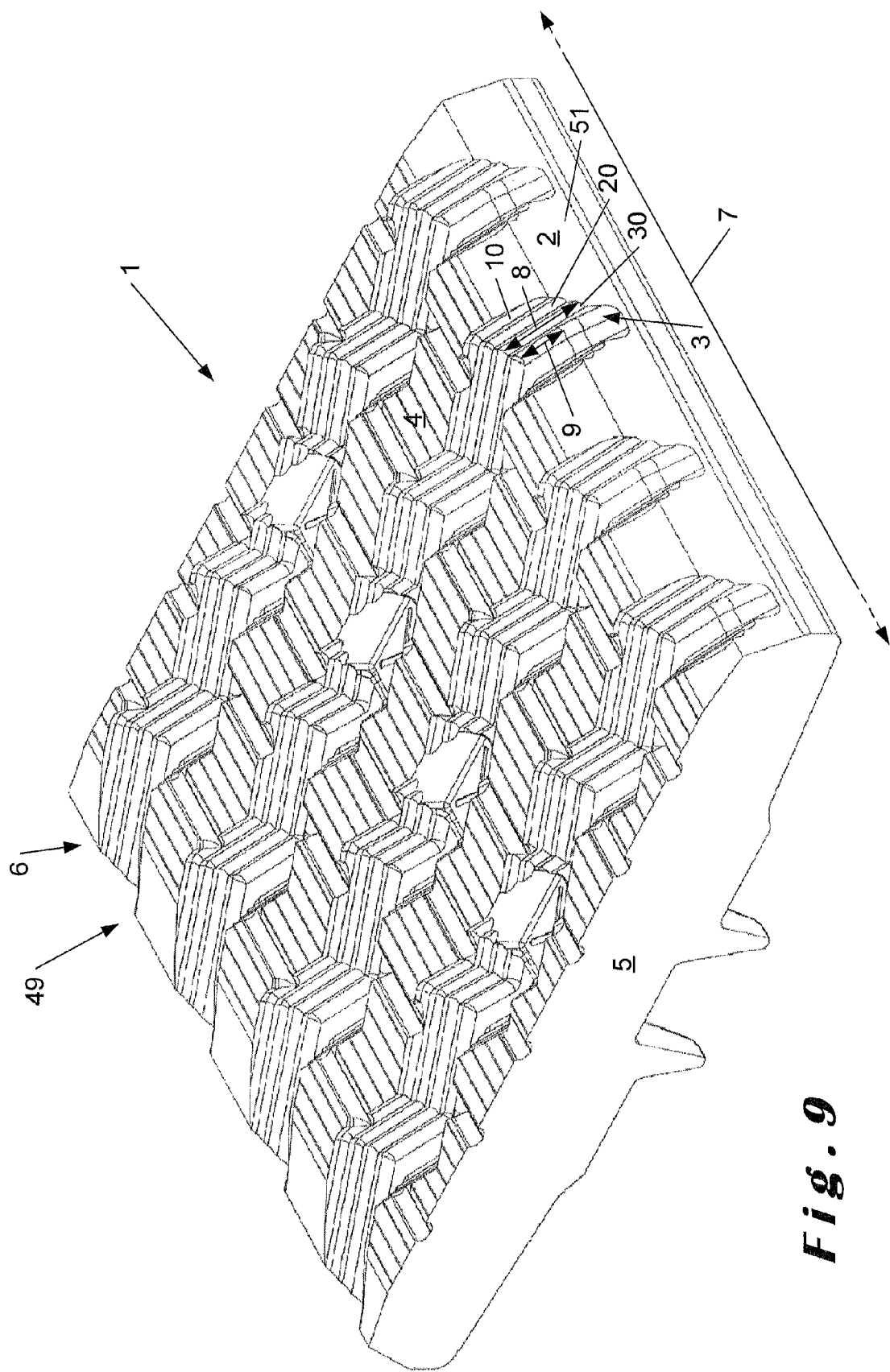
FIG. 9 shows a view in perspective of the rubber crawler of FIG. 7.
Figure 10:
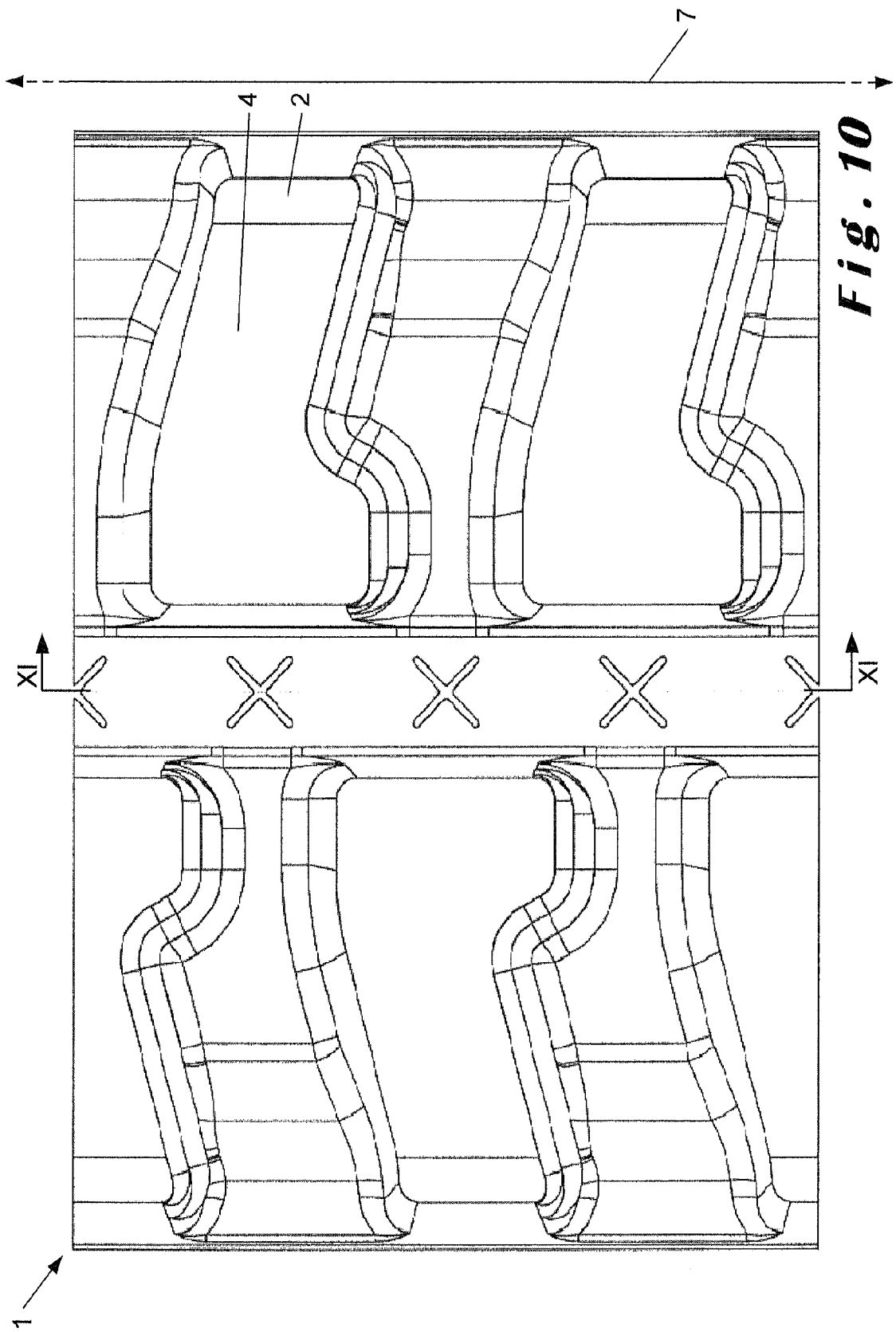
FIG. 10 shows a top view of a different rubber crawler according to the invention.

The plurality of lugs 2, forming a so-called lug pattern, provide the rubber crawler 1 with certain traction properties. The lug pattern is not critical for the invention and any lug pattern may be used. By way of an example FIGS. 4, 6 and 7, 9 show a similar lug pattern, whereas FIG. 10, 12 shows a different lug pattern for the rubber crawler 1. The lug pattern preferably is adapted to the conditions of use of the rubber crawler 1.

The rubber belt body 5 comprises at least one lug 2 with a tread surface 4 and at least one upright sidewall 3 which extends from the tread surface 4 towards the rubber belt body 5.

The tread surface 4 of the lug 2 is provided to contact the soil over which the rubber crawler is moving and is provided to at least partially support the weight of the vehicle to which the rubber crawler 1 is mounted. More preferably the tread surface 4, more specifically the shape, dimensions material (s), surface, etc. of the tread surface 4, is adapted to the conditions of use in which the rubber crawler 1 is generally used.

The tread surface 4 of the lug 2 preferably is substantially planar. This is however not critical for the invention and the tread surface 4 of the lugs 2 may be provided with a profile containing for example elevations and recesses such as for example the tread surface 4 shown in FIGS. 6 and 9.

Figure 12:
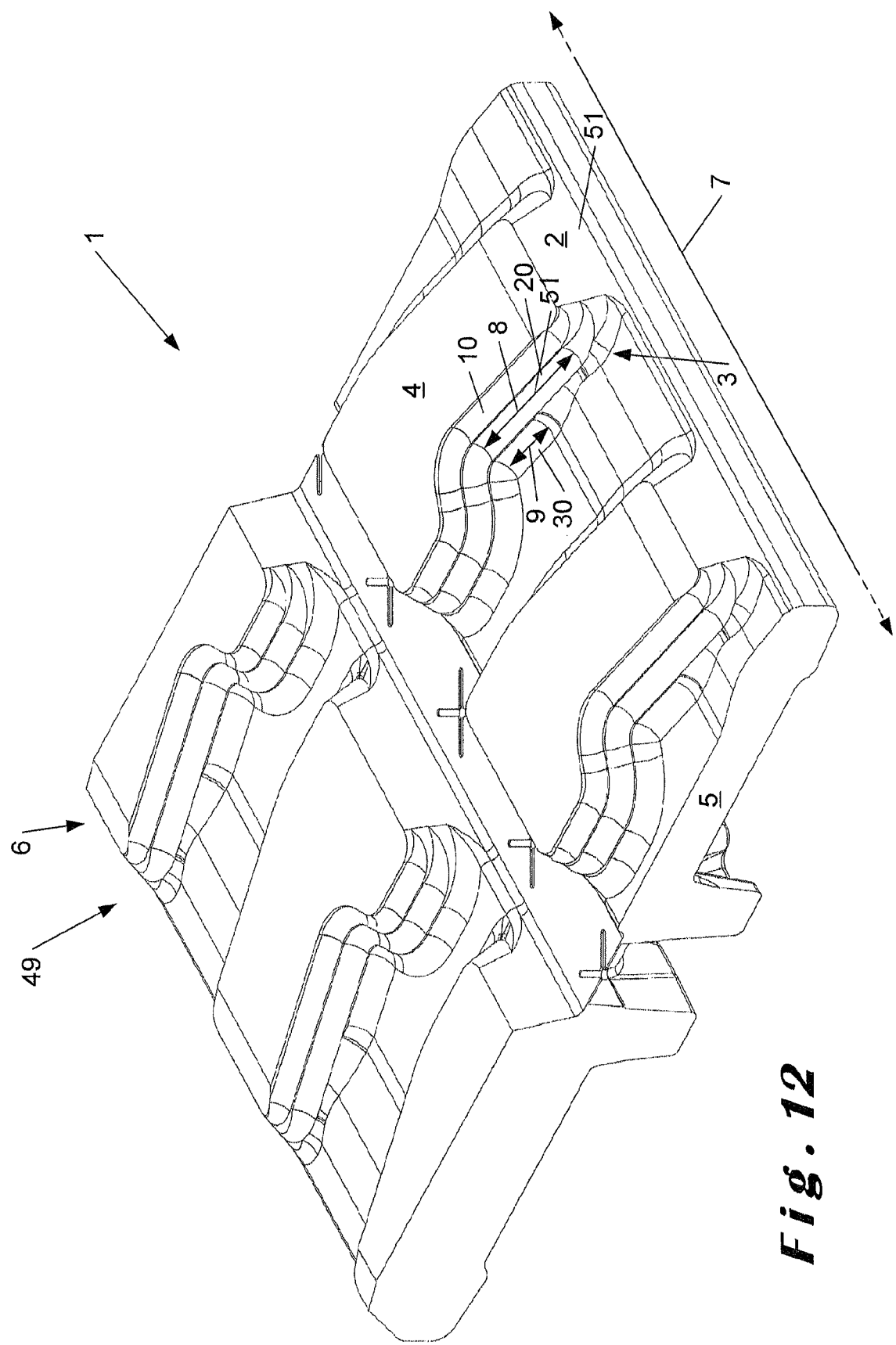
FIG. 12 shows a view in perspective of the rubber crawler of FIG. 10.

The form of the tread surface 4 can be determined by the person skilled in the art and is not critical for the invention. The shape can for example be square, rectangular, diamond shaped, trapezoid, triangular, circular, L-shaped, etc. The shape of the tread surface 4 of the lugs 2 shown in FIGS. 4, 6, 7 and 9 is for example zigzag. The shape of the tread surface 4 of the lugs 2 shown in FIGS. 10 and 12 is for example L-shaped. Preferably, the shape of the tread surface 4 is adapted to the conditions of use of the rubber crawler 1.

The dimensions of the tread surface 4 can be determined by the person skilled in the art, preferably in function of the conditions of use of the rubber crawler 1. The tread surface 4 of the lugs 2 shown in FIGS. 4, 6, 7 and 9 for example extends substantially over the entire width of the rubber crawler 1. It is however possible that the tread surface 4 of the lugs 2 extends only over part of the width of the rubber crawler 1, such as the lugs 2 shown in FIGS. 10 and 12 which substantially extend only to substantially the centre of the rubber crawler 1.

The main length direction of the tread surface 4 can be in width direction of the rubber crawler 1 such as for example for the lugs 2 shown in FIGS. 4, 6, 7 and 9. A substantial part of the tread surface 4 can however also extend in length direction 7 of the rubber crawler 1 such as the tread surface 4 of the lugs 2 shown in FIGS. 10 and 12.

Figure 6:
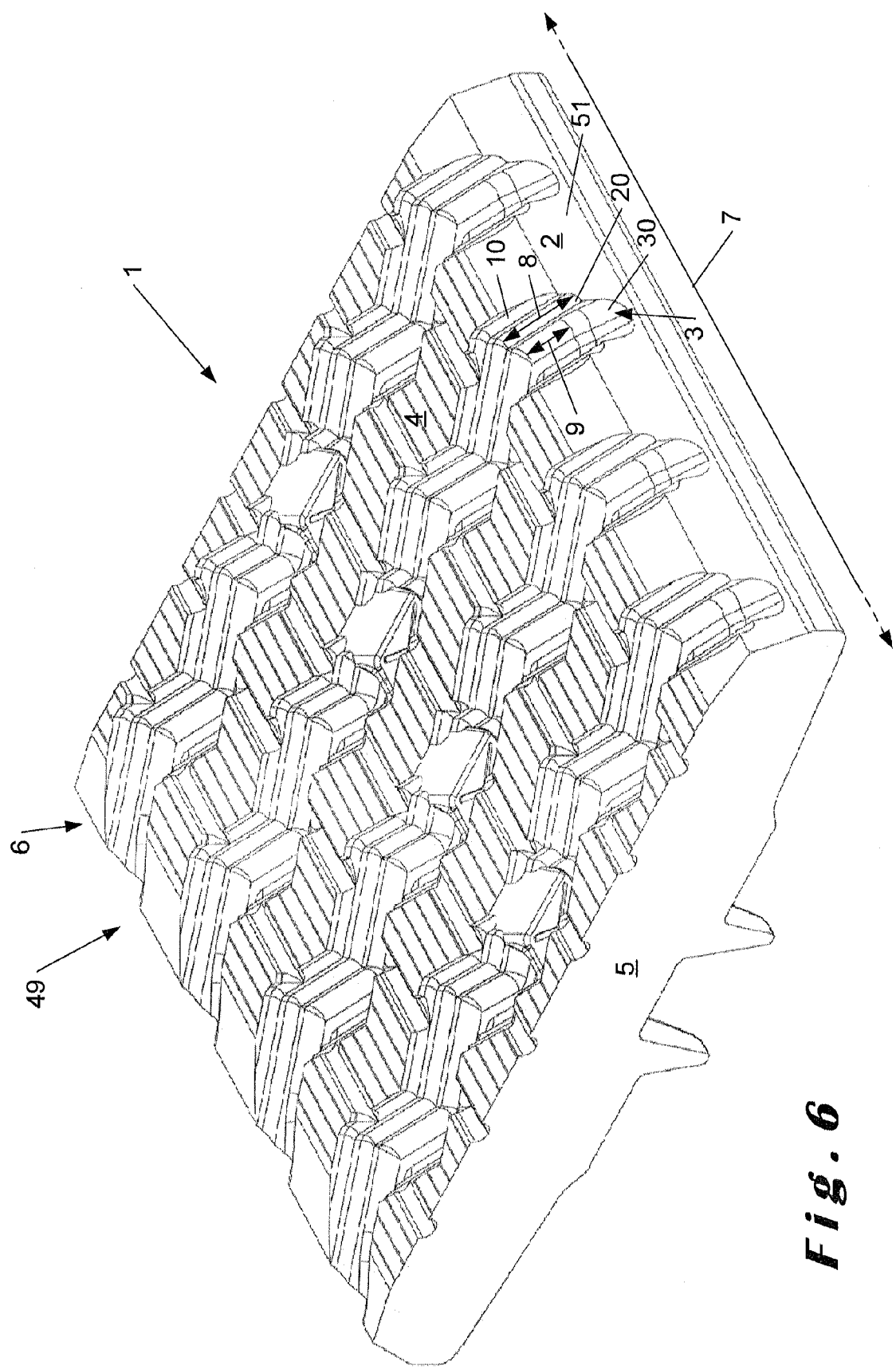
FIG. 6 shows a view in perspective of the rubber crawler of FIG. 4.
Figure 7:
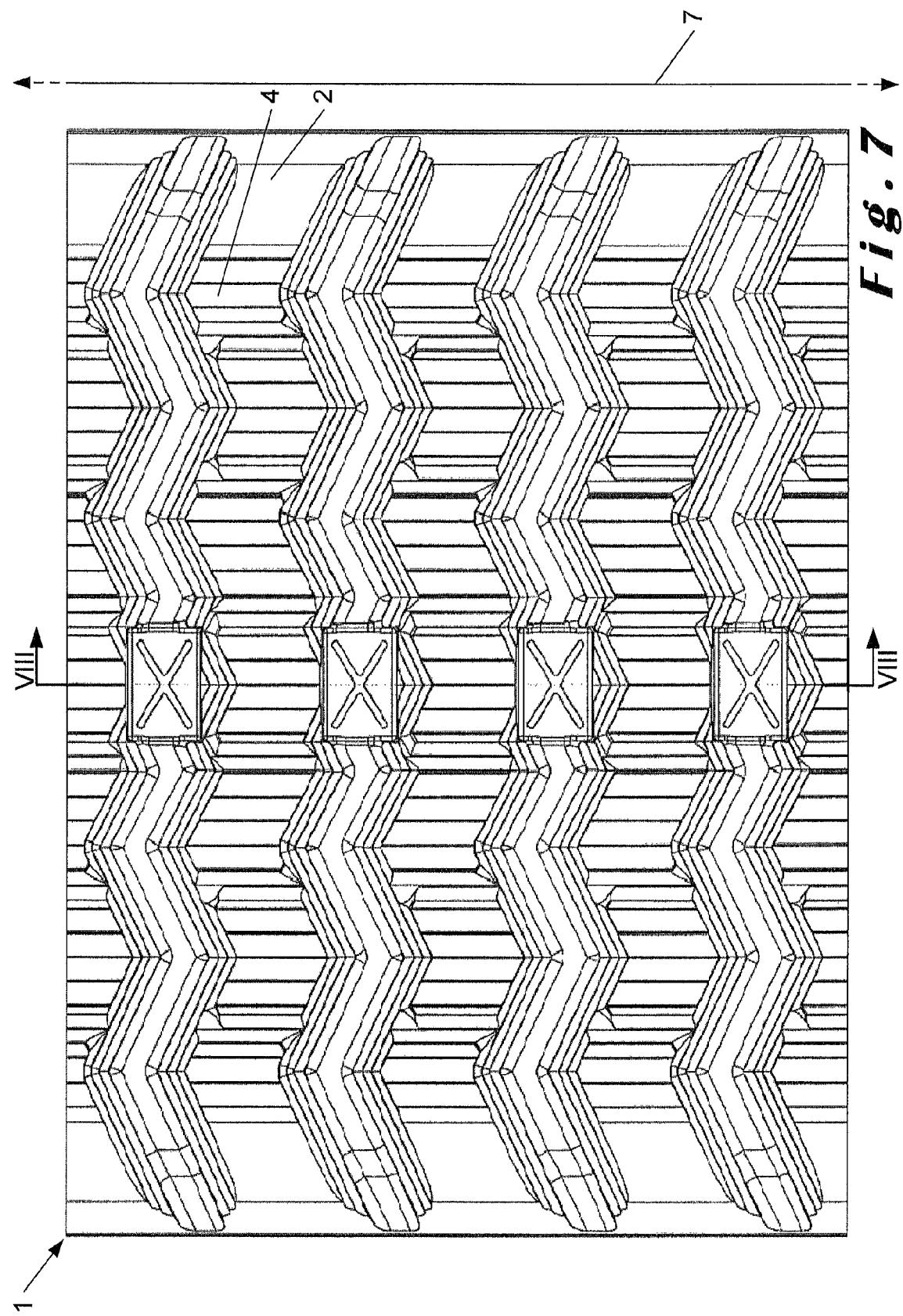
FIG. 7 shows a top view of a different rubber crawler according to the invention.

Preferably the lug 2 comprises at least two upright sidewalls 3, possibly surrounding the tread surface 4 of the lug 2. At least one of the upright sidewalls 3 extends along a first direction 8 which transverses the length direction 7 of the rubber belt body 5. The direction along which the other sidewalls 51 extend not transversing the length direction 7 is not critical for the invention and can be determined by the person skilled in the art but preferably is parallel to the length direction 7, as shown in FIGS. 6, 9 and 12.

As shown in FIGS. 10 and 12, the maximum dimension of the tread surface 4 in the length direction 7 is greater than the height of the sidewall 3.

The first direction 8 can be any direction as long as it is not parallel to the length direction 7 of the rubber crawler 1. The first direction 8 for example is substantially perpendicular to the length direction 7 of the rubber crawler 1 but the first direction 7 can also transverse under any other possible angle with the length direction 7 of the rubber crawler. The first direction 8 can be determined by the person skilled in the art and for example depends on the conditions of use for the rubber crawler 1.

The lug 2 may comprise more than one upright sidewall 3 possibly respectively extending along different first directions 8 each transversing the length direction 7 of the rubber crawler 1. The respective first directions 8 of the different upright sidewalls 3 may vary. An example of lugs 2 having different upright sidewalls 3 extending along first directions 8 is shown in FIGS. 4, 6, 7, 9, 10 and 12. The lugs 2 shown in FIGS. 4, 6, 7 and 9 for example comprise several upright sidewalls 3 extending alternatively along different first directions 8 while the first directions 8 of the alternating upright sidewalls 3 of lugs 2 shown in FIGS. 4, 6, 7 and 9 are substantially the same so that the upright sidewalls 3 are aligned along a zigzag pattern.

The number of lugs 2 and their mutual orientation and/or position is not critical for the invention and can be determined by the person skilled in the art, according to the for example the desired lug pattern and the conditions of use but preferably are regularly distributed, more preferably symmetrically. The lugs 2 shown in FIGS. 4, 6, 7, 9, 10 and 12 are substantially identical to each other and are regularly distributed over the total outer peripheral face 49 of the rubber crawler 1. The lugs 2 can however be different from each other and/or their distribution over the outer peripheral face 49 can for example be irregular.

Figure 5:
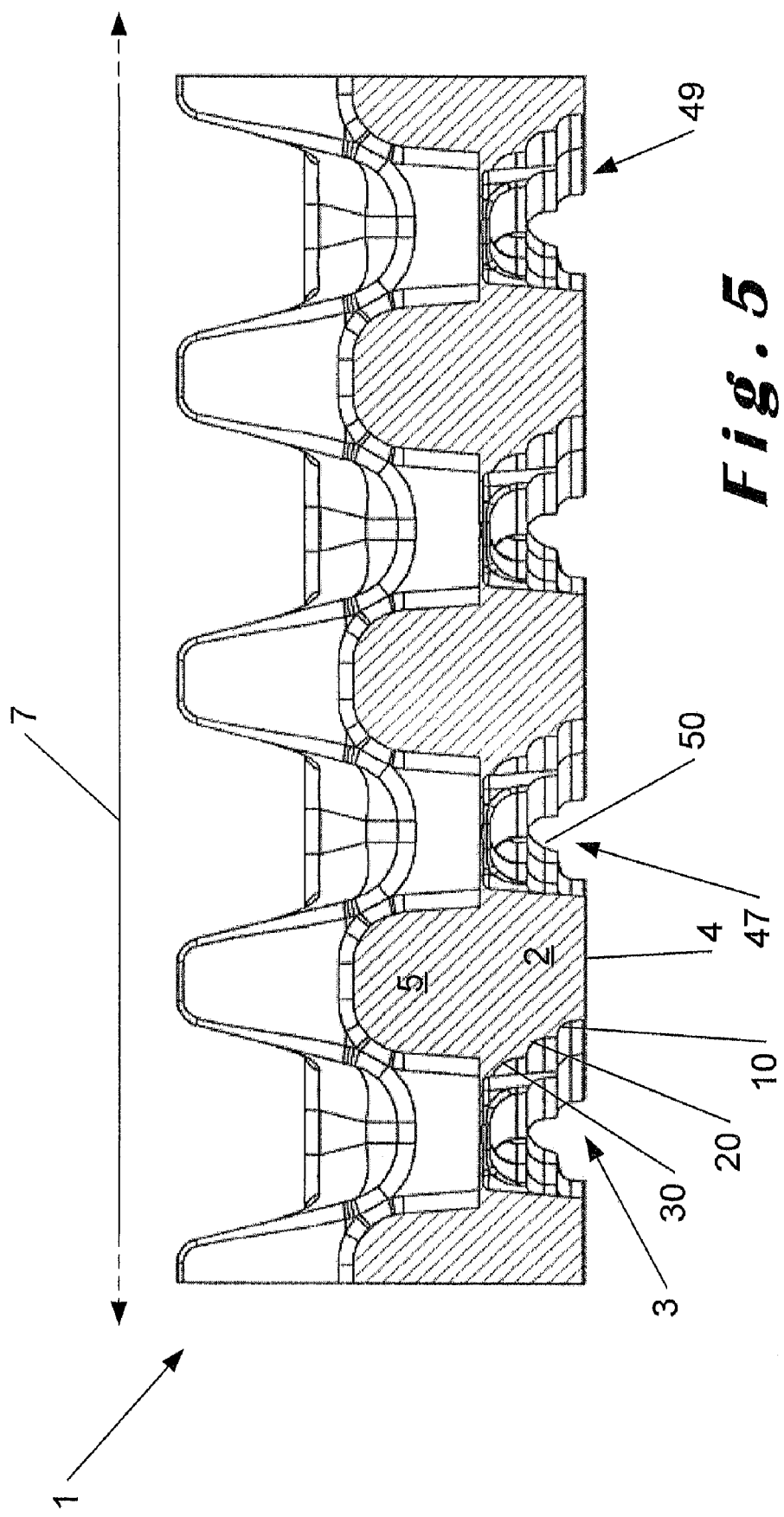
FIG. 5 shows a cross-section along a length direction of the rubber crawler of FIG. 4.
Figure 8:
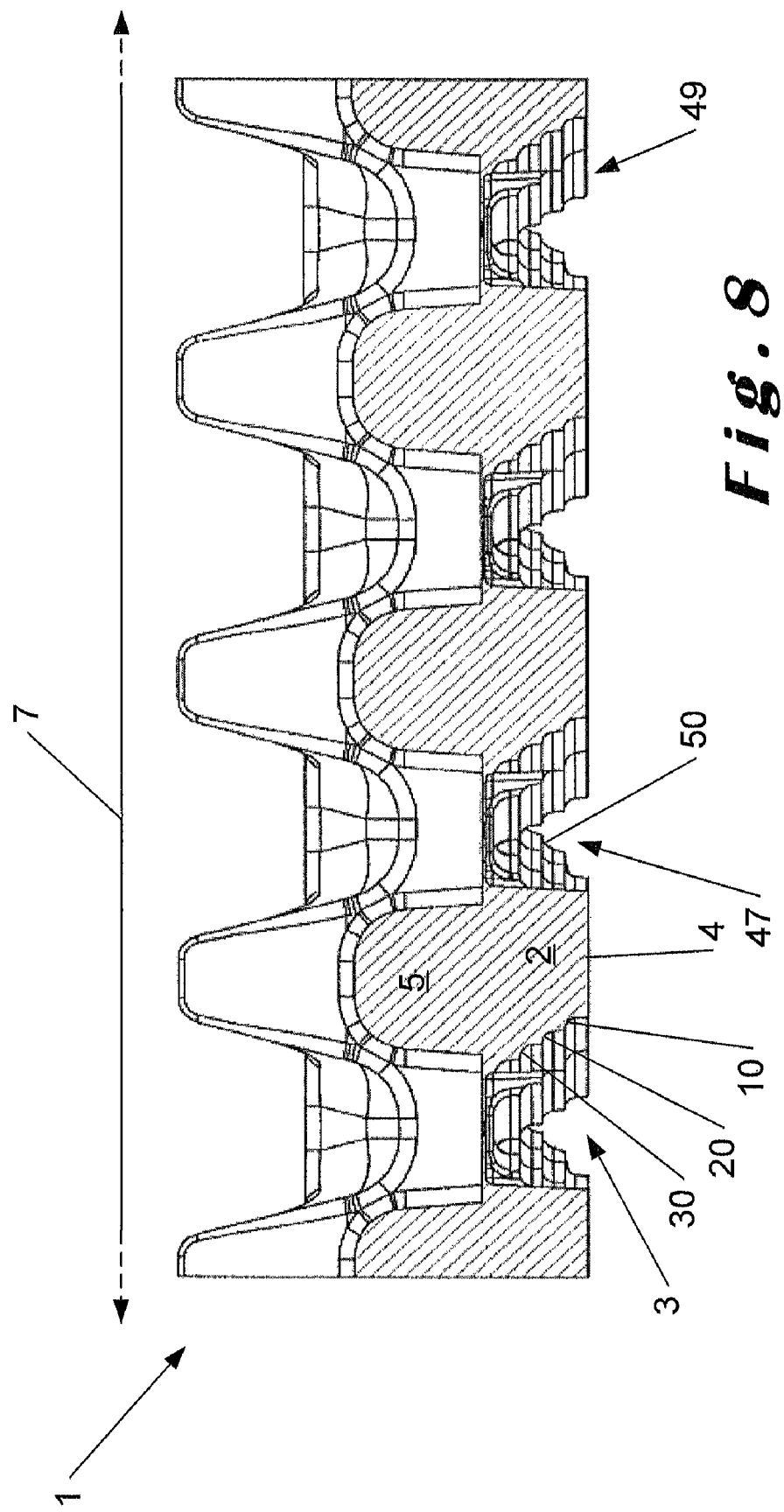
FIG. 8 shows a cross-section along a length direction of the rubber crawler of FIG. 7.
Figure 11:
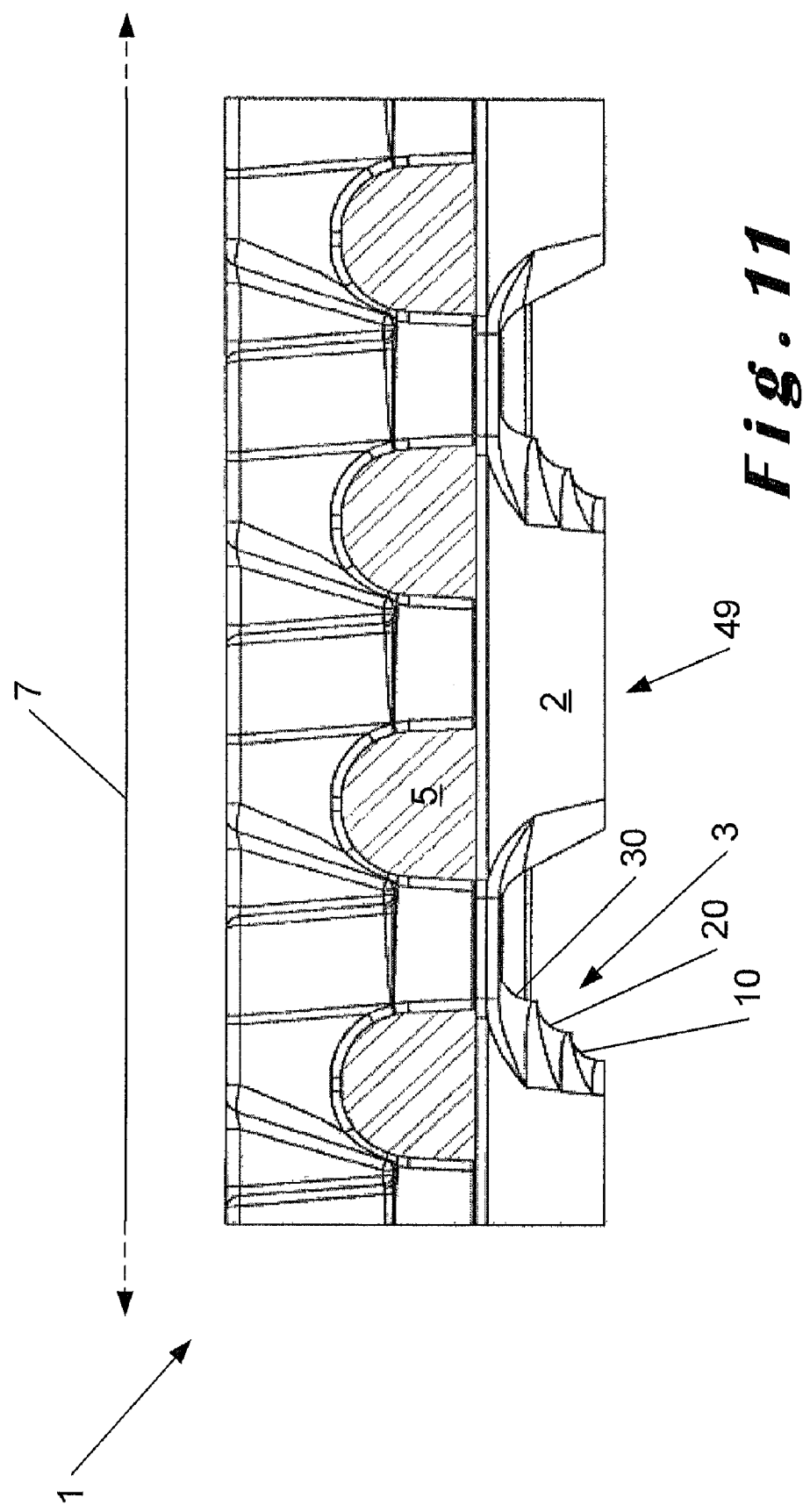
FIG. 11 shows a cross-section along a length direction of the rubber crawler of FIG. 10.

The tread surfaces 4 of the lugs 2 are provided to create a running surface 6 for the rubber crawler 1. The tread surfaces 4 thereto preferably are substantially equiplanar, as shown in FIGS. 5, 8 and 11. This is however not critical for the invention and the tread surface 4 of different lugs 2 can lie on different levels of height.

At least one of the upright sidewalls 3 extending along the first direction 8 of at least one of the lugs 2 comprises at least one groove 10, 20, 30, forming a grooved sidewall 3. The groove 10, 20, 30 extends along at least part of the upright sidewall 3 along a second direction 9 which transverses the length direction 7 of the rubber belt body 5. The lug 2 is at least partly made of a material 40 which is deformable at the position of the groove 10, 20, 30 when subjected to the bending to facilitate removal of soil material contained in the groove 10, 20, 30.

The orientation of the first direction 8 with respect to the second direction 9 is not critical for the invention and the first direction 8 can for example transverse the second direction 9 as long as the second direction 9 transverses the length direction 7 of the rubber crawler 1. Preferably, the second direction 9 is parallel to the tread surface 4 and/or is adapted to the symmetry of the rubber belt body 5 and/or the lug pattern. It is more preferred that the first 8 and the second 9 direction are parallel to each other, as for example shown in FIGS. 4, 6, 7, 9, 10 and 12 since the inventor has found that such a mutual orientation of the first 8 and the second 9 direction further improves the removal of soil material from the spaces between the lugs 2.

The groove 10, 20, 30 preferably extends along the entire length of the grooved sidewall 3, as for example shown in FIG. 10, to further improve the effect of the removal of soil material from the spaces between the lugs 2. The groove 10, 20, 30 can however also extend along only part of the grooved sidewall 3 or a plurality of subsequent grooves. Such an embodiment is however not shown in the figures.

The groove 10, 20, 30 has a cross-section having a height 11, 21, 31 delimited by an upper point 18, 28, 38 proximal to the tread surface 4 and a lower point 19, 29, 39 distal from the tread surface 4. The dimensions of the height 11, 21, 31 preferably are determined in function of the desired effect: a larger height 11, 21, 31 increases the volume available for retaining soil and can possibly be subsequently removed from the groove 10, 20, 30. However, a large height 11, 21, 31 also reduces the effect of the decreasing depth of the groove 10, 20, 30 upon bending of the belt 5 and therefore decreases the removal of soil material from the groove 10, 20, 30. Therefore, the height 11, 21, 31 of the groove 10, 20, 30 preferably is adapted to for example the characteristics of the material 40 at the location of the groove 10, 20, 30 and the conditions of use.

The cross-section of the groove 10, 20, 30 has a depth which, in the context of this application, is defined as the longest possible distance between an imaginary straight line interconnecting the upper 18, 28, 38 and lower 19, 29, 39 points of the groove 10, 20, 30 measured along a direction perpendicular to the imaginary line and a point of the cross-section of the groove 10, 20, 30. The depth of the groove 10, 20, 30 preferably is determined in function of the desired effect: a larger depth increases the amount of soil that can be received in the groove 10, 20, 30. However, a large depth also decreases the effect of the decreasing of the depth of the groove 10, 20, 30 caused by the increase of the height of the groove 10, 20, 30 due to the bending and therefore decreases the removal of soil material from the groove 10, 20, 30. Therefore, the depth of the groove 10, 20, 30 preferably is adapted to, for example, the characteristics of the material 40 at the location of the groove and the conditions of use.

The inventor has also found that the shape of the cross-section also influences the efficiency of removal of soil material from the groove 10, 20, 30 and therefore of soil material from the spaces between the lugs 2. The shape of the cross-section therefore preferably is chosen so that due to the widening of the cross-section upon bending of the belt 5 optimal removal of soil material from the groove 10, 20, 30 and therefore from the spaces between the lugs 2 is achieved.

The inventor has moreover found that the height 11, 21, 31, depth and shape of the cross-section of the groove 10, 20, 30 all have a mutual influence on the removal of material from the groove 10, 20, 30 and from the spaces between the lugs 2. These three parameters therefore are preferably chosen in function of one another and in function of, for example, the characteristics of the material 40 and the conditions of use. The person skilled in the art is capable of doing that.

The position of the groove 10 on the grooved sidewall 3 in height direction 41 of the grooved sidewall 3 is not critical for the invention but preferably the upper point 18 is located in vicinity, preferably on the tread surface 4 of the lug 2. The inventor has found that the bending is larger distal from the rubber belt body 5 and that by positioning the upper point 18 on the tread surface 4 of the lug 2 the bending can be more optimally employed to deform the cross-section of the groove 10 and to improve removal of soil material from the groove 10 and therefore from the spaces between the lugs 2.

The groove 10, 20, 30 preferably has a cross-section which widens in a direction from the interior of the lug 2 towards the exterior of the lug 2, preferably from the belt body 5 towards the tread surface 4. This is shown in FIG. 1b, wherein it can be seen that the groove 10, 20, 30 widens from a point 17, 27, 37 towards points 18 and 19, points 28 and 29 and points 38 and 39 respectively. Although different embodiments of the cross-section of the groove 10, 20, 30 are possible, such as for example a cross-section which becomes more narrow in a direction from the interior of the lug 2 towards the exterior of the lug 2, the inventor has found that removal of soil material from the groove 10, 20, 30 and therefore from the spaces between the lugs 2 is improved when the cross-section of the groove 10, 20, 30 widens in a direction from the interior of the lug towards the exterior of the lug 2. Without wanting to be bound by any theory, the inventor believes that the change of the cross-section upon bending of the belt body 5, as explained above, is improved by the widening shape of the cross-section. In other words, the widening shape enhances the increase of height 11, 21, 31 of the cross-section and the decrease of depth of the cross-section of the groove 10, 20, 30 which improves the removal of soil material from the groove 10, 20, 30 and therefore from the spaces between the lugs 2.

The cross-section of the groove 10, 20, 30 preferably is smooth, which means that it, for example, preferably does not comprise a discontinuity such as for example an inwardly or outwardly pointing edge. The inventor has found that a smooth cross-section improves the removal of soil material from the groove 10, 20, 30 since the increase of the height of the groove 10, 20, 30 and the decrease of the depth of the groove 10, 20, 30 caused by the bending is improved. More preferably, no inwardly pointing edge is provided in the groove 10, 20, 30 since the inventor has found that the risk that soil material is left behind in the edge and therefore in the groove 10, 20, 30 is increased, therefore decreasing the removal of material from the groove 10, 20, 30 and from the spaces between the lugs 2. An inwardly pointing edge moreover is more prone to cracking of the material 40 at the location of the groove 10, 20, 30.

The cross-section of the groove 10, 20, 30 preferably comprises an arcuate part 12, 22, 32. Examples of such arcuate parts 12, 22, 32 are shown in detail in FIG. 1b. In the groove 10, 20, 30 shown in FIGS. 1a and 1b, the arcuate part 12, 22, 32 spans over only part of the height 11, 21, 31 of the groove 10, 20, 30. The arcuate part 12, 22, 32 can however also span over substantially the entire height 11, 21, 31 of the groove 10, 20, 30. The arcuate part 12, 22, 32 shown in FIG. 1 is located in the groove 10, 20, 30 near the rubber belt body 5 since the inventor has found that this improves the removal of soil material from the groove 10, 20, 30. This is however not critical for the invention and the arcuate part 12, 22, 32 can also be positioned in the groove 10, 20, 30 near the tread surface 4.

The arcuate part 12, 22, 32 can be circular, elliptical, etc. but preferably is circular and has a radius 13, 23, 33. The radius 13, 23, 33 preferably is substantially constant.

The cross-section preferably also comprises a linear part 14, 24, 34, as shown in FIG. 1. The linear part 14, 24, 34 is however not critical for the invention and other shapes can be used in combination with the arcuate part 12, 22, 32. The linear part 14, 24, 34 preferably extends along a direction extending from the tread surface 4 towards the belt body 5, as shown in FIG. 1. More preferably, the arcuate part 12, 22, 23 is consecutive to the linear part 14, 24, 34, as shown in FIG. 1 and is connected to the arcuate part at an intersection point 17, 27, 37. It has been found by the inventor that a groove 10, 20, 30 having such a cross-section provides optimal removal of soil material from the groove 10, 20, 30 and therefore from the spaces between the lugs 2, probable because of optimal deformation of the cross-section of the groove under influence of the bending.

More preferably, the linear part 14, 24, 34 is a tangent to the arcuate part 12, 22, 32 at the intersection 17, 27, 37 of the linear part 14, 24, 34 with the arcuate part 12, 22, 23 offering a smooth cross-section of the groove 10, 20, 30, having the benefits explained above.

Preferably, the groove 10, 20, 30 is substantially the same along the second direction 9, as shown in FIGS. 6, 9 and 12 for the grooves 20 and 30. The cross-section can however vary along the second direction 9. The height 11, 21, 31 of the cross-section of the groove 10, 20, 30 can for example become larger or smaller along the second direction 9, the shape of the cross-section can for example change along the second direction 9, the depth of the cross-section of the groove 10, 20, 30 can for example become larger or smaller, etc.

The groove 10, shown in FIGS. 6 and 9, is for example interrupted because of the recesses present in the tread surface 4 and therefore the cross-section of the groove 10 changes at these recesses. In this specific case, the cross-section of the groove 10 only comprises an arcuate part 12 at the interruptions and the remaining arcuate part 12 becomes smaller when the recesses become deeper. Due to the recesses, also the height 11 and the depth of the groove 10 changes at the recesses. Another example of the groove 10 having a change in height 11 along the second direction 9 is shown in FIGS. 2 and 3.

Although a single groove 10, 20, 30 is sufficient for obtaining the desired effect of an improved removal of soil material from the spaces between the lugs 2, preferably at least a first 10 and a second 20 groove are provided in the grooved sidewall 3. It has been observed that the by providing additional grooves 10, 20 in the grooved sidewall 3, the removal of material from the spaces between the lugs 2 can be further optimised.

More than two grooves 10, 20 can be provided in the grooved sidewall 3. For example three grooves 10, 20, 30 can be provided in the grooved sidewall 3, as for example shown in FIGS. 2, 3, 4, 5, 6, 10, 11 and 12, or for example four grooves, as for example shown in FIGS. 7, 8 and 9. Although grooved sidewalls 3 having more than 4 grooves are not shown, it is possible to provide the grooved sidewall 3 with more than four grooves such as for example five grooves, six grooves, seven grooves, eight grooves, nine grooves, ten grooves, etc.

Although the mutual orientation of the second direction 9 of the grooves 10, 20, 30 is not critical for the invention, the grooves 10, 20, 30 preferably do not intersect each other. This is however not critical for the invention and the grooves 10, 20, 30 can also intersect each other.

Although the second direction 9 of each of the grooves 10, 20, 30 can be chosen independently from each other, the second directions 9 of the grooves 10, 20, 30 preferably are parallel.

Although not critical for the invention, the grooves 10, 20, 30 preferably are shifted in height direction with respect to each other. The grooves 10, 20, 30 can however also be provided subsequent to each other so that several grooves 10, 20, 30 are provided along substantially a single second direction 9. Or a combination of both is possible, so that several grooves 10, 20, 30 have a common second direction 9 and other grooves have another second direction 9.

The grooves 10, 20, 30 more preferably are adjacent to each other, and are delimited from each other by a discontinuity 42, 43 having at least one transversely extending edge 44, 45 protruding from the grooves 10, 20, 30 towards an adjacent lug 2, as shown in FIGS. 1, 5, 6, 8, 9, 11 and 12. This is however not critical for the invention and a part of the grooved sidewall 3 not comprising a groove can lie between the grooves 10, 20, 30. Such a configuration is however not shown in the figures. The inventor has found that by providing the grooved sidewall 3 with adjacent grooves 10, 20, 30, the removal of soil material from the grooves 10, 20, 30 and therefore from the spaces between the lugs 2 can be improved. The grooves 10, 20, 30 can also be continuously delimited from each other.

In the adjacent configuration of the grooves 10, 20, 30, the lower point 19 of the first groove 10 preferably also is the upper point 18 of the second groove 20, as shown in FIG. 1. When three grooves 10, 20, 30 are provided, the lower point 29 of the second groove 20 also is the upper point of the third groove 30.

Preferably, the height 11, 21, 31 of the grooves 10, 20, 30 is substantially equal, as shown in FIG. 1. However, the grooves 10, 20, 30 can have different heights 11, 21, 31.

The upper point 18 of the groove 10 proximal to the tread surface 4 preferably is provided near, or more preferably substantially onto the tread surface 4 of the lug 2. This is however not critical for the invention and the lower point 39 of the groove 30 distal from the tread surface 4 can for example be provided near or substantially onto the rubber belt body 5.

Preferably, when the lower point 19, 29, 39 is provided onto the rubber belt body 5, the arcuate part 12, 22, 32 continuously changes into the rubber belt body 5 as the inventor has found that such a transition increases the removal of soil material from the spaces between the lugs 2.

More preferably, the heights 11, 21, 31 of the grooves 10, 20, 30 together substantially span the height 41 of the grooved sidewall 3, as shown in FIGS. 1, 2 and 3. In that case the upper point 18 of the groove 10 proximal to the tread surface 4 is provided onto the tread surface 4 and the lower point 39 of groove 30 distal from the tread surface 4 is provided onto the rubber belt body 5. The heights 11, 21, 31 of the grooves 10, 20, 30 then preferably divide the height of the grooved sidewall 3 in equal parts. When two such grooves 10, 20 are for example provided, the height 11, 21 of the grooves 10, 20 each is substantially half of the height of the grooved sidewall 3. When three such grooves 10, 20, 30 are for example provided, the height 11, 21, 31 of the grooves 10, 20, 30 each is substantially a third of the height of the grooved sidewall 3. When four such grooves 10, 20, 30 are for example provided, the height 11, 21, 31 of the grooves 10, 20, 30 each is substantially a fourth of the height of the grooved sidewall 3. The heights 11, 21, 31 can however also span only part of the height 41 of the grooved sidewall 3.

Preferably, the shape of the cross-section of the grooves 10, 20, 30 is substantially the same, as shown in FIGS. 1a and 1b. More preferably, the shape described above, as shown in FIGS. 1a and 1b. This is however not critical for the invention and the grooves 10, 20, 30 can have a different shape.

Preferably, the dimensions of the cross-sections of the grooves 10, 20, 30 is adapted to the location of the groove 10, 20, 30 on the grooved sidewall 3. For example, the arcuate part 12, 22, 23 of each of the grooves 10, 20, 30 has a mean radius 13, 23, 33, preferably substantially constant radius as described above, and the mean radius 13, 23 of a groove 10, 20 proximal to the tread surface 4 is smaller than the mean radius 23, 33 of a groove 20, 30 distal from the tread surface 4. As shown in FIG. 1, the radius 13 of groove 10 is smaller than the radius 23 of the groove 20 and the radius 23 of the groove 20 is on its turn smaller than the radius 33 of the groove 30. Also the length of the linear part 14, 24, 34 can be different for the different grooves 10, 20, 30.

Although the dimensions of the cross-section of the groove 10, 20, 30 can be different for each of the grooves 10, 20, 30 of the grooved sidewall 3, the height 11, 12, 13 of each of the grooves 10, 20, 30 preferably is substantially the same, as described above.

The material 40 at the position of the groove 10, 20, 30 for deforming the groove 10, 20, 30 when subjected to the bending preferably has a hardness of 30-80 durometer shore A. The inventor has found that by providing material 40 at the location of the groove having such characteristics for the hardness, an optimal balance is found between the support offered by the lug 2 and the necessary deformability of the cross-section when subjected to the bending.

Although one grooved sidewall 3 is sufficient for the invention, preferably more grooved sidewalls 3 are provided to further improve the removal of material from the spaces between the lugs 2.

Preferably, the grooved sidewall 3 of the lug 2 faces the first member when moving from the first member to the second member. In a revolving movement. When moving from the first to the second member, the rubber crawler 1 defines a travelling direction for the vehicle provided with the rubber crawler 1. The vehicle therefore has a front side pointing in direction of the travelling direction and a back side pointing away from the travelling direction. The inventor has now found that when the grooved upright sidewall 3 faces the first member when moving from the first member to the second member, the removal of soil material from the groove 10, 20, 30 and therefore from the spaces between the lugs 2 is increased near the back side of the vehicle so that the removed soil material is substantially left behind the vehicle and is not piled up in front of the vehicle. This is however not critical for the invention and the grooved sidewall 3 can also face the second member when moving from the first member to the second member.

More preferably, the lug 2 comprises at least two grooved sidewalls 3, one grooved sidewall 3 facing the first member when moving from the first member towards the second member and one grooved sidewall 3 facing the second member when moving from the first member towards the second member. In other words, the lug 2 comprises a first 3 and a second 47 upright grooved sidewall on opposing sides of the lug 2. Such lugs are for example shown in FIGS. 4, 5, 6, 7, 8 and 9. This way the removal of soil material from the grooves 10, 20, 30 and therefore from the spaces between the lugs 2 is further increased and the effect of an increased removal of soil material near the back side of the vehicle occurs for opposing travelling directions. This is especially relevant for tracked vehicle since those vehicles are often provided with a rotatable cabinet for the person operating the vehicle so that the vehicle is often used in opposing travelling directions.

FIGS. 10, 11 and 12 for example show a rubber track 1 having lugs 2 which have only grooved sidewalls 3 on a side of the lug 2 which is designed to face the first member when moving from the first member to the second member.

Preferably, at least two lugs 2, more preferably all of the lugs 2, are provided with at least one grooved sidewall 3 to further increase the removal of soil material from the spaces between the lugs 2 to further increase the effect of the removal of soil material from the spaces between the lugs 2.

The invention also relates to a method for making a rubber crawler 1 according to the invention. The groove 10, 20, 30 according to the invention can for example be made by starting from a known rubber crawler 1 after which at least one groove 10 is made in an upright sidewall 48 extending from the tread surface 4 to the rubber belt body 5 along a first direction 8 which transverses the length direction 7 of the rubber belt body 5 by for example removing material from the upright sidewall 48. The removal of material can for example be done by cutting, carving, etc.

Preferably however, the rubber crawler 1 according to the invention is made by superposing material 40 at least partially to an existing sidewall 48 extending from the tread surface 4 to the rubber belt body 5 along a first direction 8 which transverses the length direction 7 of the rubber belt body 5, thereby forming a grooved sidewall 3 as described earlier on.

An example of material 40 superposed onto an existing upright sidewall 48 is shown in FIG. 1.

The upright sidewall 48 near the tread surface 4 substantially extends under an angle $\alpha$ 46 with a normal to the tread surface 4. The angle $\alpha$ 46 can be any possible angle but preferably substantially lies between 0°-45° with the normal to the tread surface 4.

An upper part 15, 25, 35 of the groove 10, 20, 30 is substantially closest to the tread surface 4 of the lug 2 and preferably forms an angle $\beta_{1, 2, 3}$ 16, 26, 36 of between 5°-30° with the upright sidewall 48.

The angle $\beta_{1, 2, 3}$ 16, 26, 36 preferably is chosen in function of the angle $\alpha$ 46 such that the obtained cross-section of the groove 10, 20, 30 improves the removal of soil material from the groove 10, 20, 30 and therefore from the spaces between the lugs 2. Generally, the upper part 15, 25, 35 of the groove 10, 20, 30 therefore forms an angle $\gamma_{1, 2, 3}$ of between 5°-75° with the normal to the tread surface 4.

Preferably, the angle $\beta_{1, 2, 3}$ 16, 26, 36 lies between 12°-18° and therefore the angle $\gamma_{1, 2, 3}$ lies between 12°-63°. More preferably, the angle $\beta_{1, 2, 3}$ 16, 26, 36 is 15° and therefore the angle $\gamma_{1, 2, 3}$ lies between 15°-60°.

When at least two, preferably three, grooves 10, 20, 30 are made on the upright sidewall 48, the first $\beta_1$ 16, second $\beta_2$ 26, third $\beta_3$ 36 and final $\beta_i$ angle of the respective first 10, second 20, third 30 and final groove preferably are adapted to each other. Preferably, $\beta_1 \leq \beta_2 \leq \beta_3 \leq \ldots \leq \beta_i$ and more preferably $\beta_1 = \beta_2 = \beta_3 = \ldots = \beta_i$ since the inventor has found that grooves 10, 20, 30 having such a relation with each other offer the increased removal of soil material from the grooves 10, 20, 30 and therefore from the spaces between the lugs 2 while offering a stable support of the rubber belt body 5 and a vehicle provided with the rubber crawler 1. However, $\beta_1 > \beta_2 > \beta_3 > \ldots > \beta_i$ is also possible although the inventor has found that such a configuration offers a less stable support to the rubber belt body 5 and a vehicle provided with such a rubber crawler 1. In case $\beta_1 > \beta_2 > \beta_3 > \ldots > \beta_i$, it is preferably avoided that the resulting grooved sidewall 3 becomes substantially convex since it has been found that a convexly shaped resulting grooved sidewall 3 offers a less stable support for the rubber belt body 5 and for a vehicle provided with the rubber crawler 1.

The invention claimed is:

1. A rubber crawler for traction of a tracked vehicle, said rubber crawler comprising an endless rubber belt body for revolving around first and second members that are spaced from each other, said belt body bending when revolving around the first and second members, said belt body having a length direction, said belt body comprising an outer peripheral face including a plurality of lugs that protrude outwardly from said belt body, each lug of said plurality of lugs comprising: (i) a tread surface at an outermost end of said lug; and (ii) a sidewall extending outwardly from said belt body to said tread surface, said sidewall comprising a groove extending transversely to said length direction of said belt body, said lug comprising deformable material such that, when said lug bends around a given one of the first and second members, said groove deforms to facilitate removal of soil material contained in said groove.

2. A rubber crawler as defined in claim 1, wherein said groove is a first groove, wherein said sidewall comprises a second groove extending transversely to said length direction of said belt body and being generally below said first groove, and wherein said deformable material is such that, when said lug bends around the given one of the first and second members, said first and second grooves deform to facilitate removal of soil material contained in said first and second grooves.

3. A rubber crawler as defined in claim 2, wherein said sidewall further comprises a third groove extending transversely to said length direction of said belt body and being generally below said second groove, and wherein said deformable material is such that, when said lug bends around the given one of the first and second members, said first, second, and third grooves deform to facilitate removal of soil material contained in said first, second, and third grooves.

4. A rubber crawler as defined in claim 2, wherein said first and second grooves have a combined height and said sidewall has a height, said combined height of said first and second grooves being substantially equal to said height of said sidewall along at least part of said sidewall.

5. A rubber crawler as defined in claim 1, wherein said groove has a cross-section which widens in a direction from an interior of said lug towards an exterior of said lug.

6. A rubber crawler as defined in claim 1, wherein said groove has a cross-section comprising a generally arcuate part.

7. A rubber crawler as defined in claim 6, wherein said cross-section of said groove comprises a generally linear part.

8. A rubber crawler as defined in claim 1, wherein said deformable material has a hardness between 30 durometer Shore A and 80 durometer Shore A.

9. A rubber crawler as defined in claim 1, wherein a dimension of said tread surface in said length direction of said belt body is greater than a height of said sidewall.

10. A rubber crawler as defined in claim 1, wherein said sidewall is a first sidewall, said lug further comprises a second sidewall opposite said first sidewall and, when said lug moves from the first member to the second member as said belt body revolves around the first and second members, said first sidewall faces the first member.

11. A rubber crawler for traction of a tracked vehicle, said rubber crawler comprising an endless rubber belt body for revolving around first and second members that are spaced from each other, said belt body bending when revolving around the first and second members, said belt body having a length direction, said belt body comprising an outer peripheral face including a plurality of lugs that protrude outwardly from said belt body, each lug of said plurality of lugs comprising: (i) a tread surface at an outermost end of said lug; and (ii) a sidewall extending outwardly from said belt body to said tread surface, a maximum dimension of said tread surface in said length direction of said belt body being greater than a height of said sidewall, said sidewall comprising a groove extending transversely to said length direction of said belt body, said lug comprising deformable material such that, when said lug bends around a given one of the first and second members, said groove deforms.

12. A rubber crawler for traction of a tracked vehicle, said rubber crawler being revolvable around a plurality of wheels of the tracked vehicle, said rubber crawler comprising an endless rubber belt comprising an inner side for facing the plurality of wheels and a ground-contacting outer side for contacting the ground, said ground-contacting outer side comprising a plurality of traction lugs that project outwardly and are distributed along a length direction of said rubber crawler, each traction lug of said plurality of traction lugs comprising: (a) a base; (b) a tread surface at an outermost end of said traction lug; and (c) a sidewall extending outwardly from said base to said tread surface and extending transversely to said length direction of said rubber crawler, said sidewall comprising a groove, said groove having a depth measured perpendicularly from an imaginary straight line interconnecting two points of said sidewall which delimit said groove, said traction lug comprising deformable material such that, when said traction lug bends around a wheel of the plurality of wheels, said groove deforms.

13. A rubber crawler as defined in claim 12, wherein, when said groove deforms as said traction lug bends around the wheel, said depth of said groove decreases and a bottom of said groove moves outwardly.

14. A rubber crawler as defined in claim 12, wherein, when said groove deforms as said traction lug bends around the wheel, said groove tends to push soil material contained in said groove out of said groove.

15. A rubber crawler as defined in claim 12, wherein a maximum dimension of said tread surface in said length direction of said rubber crawler is greater than a height of said sidewall.

16. A rubber crawler as defined in claim 12, wherein said groove is a first groove, said sidewall comprising a second groove extending transversely to said length direction of said rubber crawler and disposed generally below said first groove, said second groove having a depth measured perpendicularly from an imaginary straight line interconnecting two points of said sidewall which delimit said second groove, said deformable material being such that, when said traction lug bends around the wheel, said first and second grooves deform.

17. A rubber crawler as defined in claim 16, wherein said first groove and said second groove are contiguous such that a given one of said two points of said sidewall which delimit said first groove is a given one of said two points of said sidewall which delimit said second groove.

18. A rubber crawler as defined in claim 16, wherein said sidewall has a height and said first groove and said second groove have a combined height which is substantially equal to said height of said sidewall along at least part of said sidewall.

19. A rubber crawler as defined in claim 12, wherein said groove extends along substantially an entirety of a length of said sidewall.

20. A rubber crawler as defined in claim 12, wherein said sidewall is a first sidewall, said traction lug comprises a second sidewall opposite said first sidewall and, when said traction lug moves from a front wheel of the plurality of wheels to a back wheel of the plurality of wheels as said rubber crawler revolves around the plurality of wheels, said first sidewall faces the front wheel.

21. A crawler for propelling a tracked vehicle on a ground surface, the tracked vehicle comprising a crawler drive arrangement including at least one wheel for imparting movement to said crawler along a drive direction, said crawler comprising an endless belt for mounting on the crawler drive arrangement, said endless belt comprising a body and a plurality of traction lugs projecting from said body, each traction lug comprising (i) a base proximal to said body, (ii) an outermost surface distal to said body and defining a ground-engaging interface between said traction lug and the ground surface, and (iii) a sidewall extending between said base and the ground-engaging interface, said sidewall extending in a direction that is non-parallel to said drive direction, said sidewall including a recess configured to resiliently distort when said traction lug bends around the wheel of the crawler drive arrangement.

22. A crawler as defined in claim 21, wherein said sidewall defines an angle of at least 45° relative to a normal to said outermost surface.

23. A crawler as defined in claim 21, wherein said recess extends longitudinally along a direction that is transverse to said drive direction.

24. A crawler as defined in claim 21, wherein said recess has a cross-sectional configuration that varies when said traction lug bends around the wheel of the crawler drive arrangement.

25. A crawler as defined in claim 24, wherein said recess becomes shallower when said traction lug bends around the wheel of the crawler drive arrangement.

26. A crawler as defined in claim 24, wherein said sidewall includes a plurality of recesses, extending side-by-side, configured to resiliently distort when said traction lug bends around the wheel of the crawler drive arrangement.

27. A crawler as defined in claim 24, wherein said cross-sectional configuration of said recess has a portion that is arcuate.

28. A crawler as defined in claim 21, wherein said traction lug tapers from said base to said outermost surface.

29. A crawler as defined in claim 21, wherein the ground surface materializes an imaginary ground plane and said recess is located on said side wall such that, when said outermost surface of said traction lug rests on the ground surface, said recess is spaced apart from the imaginary ground plane.

30. A crawler as defined in claim 21, wherein a maximum dimension of said outermost surface in said drive direction is greater than a height of said sidewall.

\* \* \* \* \*